(12) United States Patent
Thomson et al.

(10) Patent No.: US 6,945,135 B1
(45) Date of Patent: *Sep. 20, 2005

(54) BICYCLE STEM FOR ENLARGED HANDLEBAR PORTIONS AND ASSOCIATED METHODS

(75) Inventors: Loronzo H. Thomson, Warner Robins, GA (US); Brian Thomson, Warner Robins, GA (US); Mark P. McJunkin, Macon, GA (US)

(73) Assignee: L. H. Thomson Company, Inc., Macon, GA (US)

( * ) Notice: Subject to any disclaimer, the term of this patent is extended or adjusted under 35 U.S.C. 154(b) by 108 days.

This patent is subject to a terminal disclaimer.

(21) Appl. No.: 09/658,509

(22) Filed: Sep. 8, 2000

Related U.S. Application Data

(60) Provisional application No. 60/153,159, filed on Sep. 9, 1999.

(51) Int. Cl.$^7$ .................................................. B62K 21/18
(52) U.S. Cl. ..................... 74/551.1; 403/344; 403/373; 403/374.1; 403/408.1; 403/409.1
(58) Field of Search ........................... 74/551.1–551.8; 403/344, 373, 374.1–374.3, 408.1, 409.1

(56) References Cited

U.S. PATENT DOCUMENTS

| | | | | |
|---|---|---|---|---|
| 4,616,949 A | * | 10/1986 | Kellner | 403/104 |
| 4,783,187 A | | 11/1988 | McMurtrey | 403/24 |
| D300,014 S | | 2/1989 | Borromeo | D12/118 |
| D306,418 S | | 3/1990 | McMurtrey | D12/118 |
| D307,405 S | | 4/1990 | Kiyota | D12/118 |
| 4,916,970 A | | 4/1990 | McMurtrey | 74/555.1 |
| 4,969,374 A | | 11/1990 | Borromeo | 74/551.1 |
| D313,206 S | | 12/1990 | Ringle | D12/118 |
| 5,138,900 A | | 8/1992 | Hals | 74/551.7 |
| 5,165,301 A | * | 11/1992 | Jeshurun et al. | 74/551.1 |
| 5,181,436 A | | 1/1993 | Lai | 74/551.2 |
| 5,193,930 A | | 3/1993 | Chi | 403/24 |
| 5,201,244 A | | 4/1993 | Stewart et al. | 74/551.3 |
| 5,213,006 A | | 5/1993 | Liao | 74/551.1 |
| D341,801 S | | 11/1993 | McCormack et al. | D12/118 |
| 5,263,351 A | | 11/1993 | Berg, III | 72/208 |
| D342,050 S | | 12/1993 | Tore Gustafsson | D12/178 |
| 5,273,302 A | | 12/1993 | Ureel | 280/279 |
| 5,323,664 A | | 6/1994 | Fairfield et al. | 74/551.3 |
| D348,636 S | | 7/1994 | Williams et al. | D12/118 |

(Continued)

*Primary Examiner*—Chong H. Kim
(74) *Attorney, Agent, or Firm*—Allen, Dyer, Doppelt, Milbrath & Gilchrist, P.A.

(57) ABSTRACT

A bicycle stem may include a body portion and a handlebar clamping portion connected thereto, and a handlebar clamping member cooperating with the handlebar clamping portion to clamp the bicycle handlebar. The handlebar clamping member and the handlebar clamping portion may each have a cavity in a respective medial portion thereof to accommodate an enlarged diameter portion of the handlebar. The handlebar clamping member may have a generally rectangular shape with a recess therein defining with the cavity a pair of spaced apart contact areas for contacting the handlebar. The handlebar clamping member may also be completely removable from the handlebar clamping portion in some embodiments, to facilitate installation of the handlebar. The handlebar clamping portion may also have a recess therein defining with the cavity a pair of spaced apart contact areas for contacting the handlebar. The body portion may also have a tubular shape with a hollow interior, and the cavity of the handlebar clamping portion may have an opening therein in communication with the hollow interior of the body portion.

24 Claims, 7 Drawing Sheets

U.S. PATENT DOCUMENTS

| | | | |
|---|---|---|---|
| 5,327,798 A | 7/1994 | Lerch, Jr. | 74/551.3 |
| 5,330,220 A | 7/1994 | Nagano | 280/279 |
| 5,330,302 A | 7/1994 | Chen | 411/79 |
| D354,259 S | 1/1995 | Kurke et al. | D12/118 |
| D356,759 S | 3/1995 | Pawsat | D12/118 |
| 5,404,769 A | 4/1995 | Kao | 74/551.3 |
| 5,437,208 A | 8/1995 | Cheng | 74/551.1 |
| 5,442,973 A | 8/1995 | Liao | 74/551.1 |
| 5,477,747 A | 12/1995 | Cheng | 74/551.1 |
| 5,509,328 A | 4/1996 | Lai | 74/551.3 |
| 5,536,102 A | 7/1996 | Kao | 403/320 |
| 5,687,616 A | 11/1997 | Marui | 74/551.1 |
| 5,782,479 A * | 7/1998 | Adams et al. | 280/279 |
| 5,842,385 A | 12/1998 | Su | 74/551.3 |
| 5,865,069 A | 2/1999 | Edwards | 74/551.1 |
| 5,881,606 A * | 3/1999 | Roddy | 280/279 |
| 5,888,015 A | 3/1999 | Brown et al. | 403/379.1 |
| 6,058,800 A * | 5/2000 | Giard | 280/279 |
| 6,309,135 B1 * | 10/2001 | Thomson et al. | 403/344 |
| 6,343,891 B1 * | 2/2002 | Combs | 403/385 |

\* cited by examiner

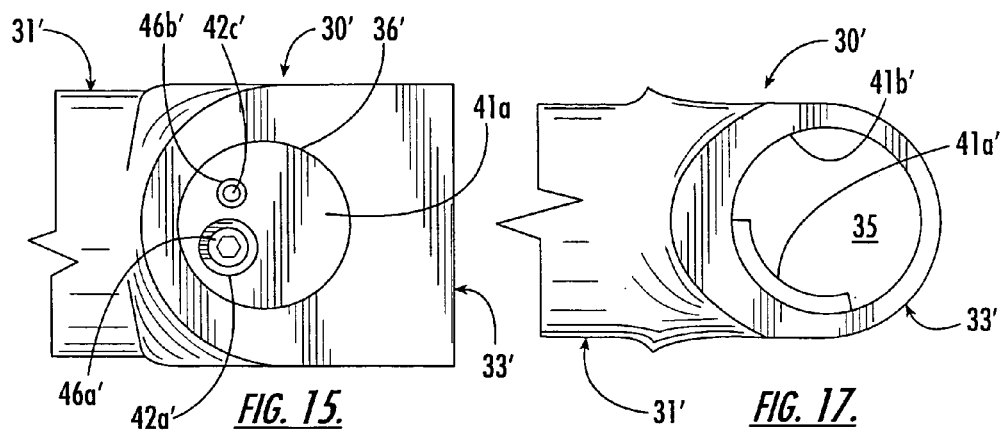
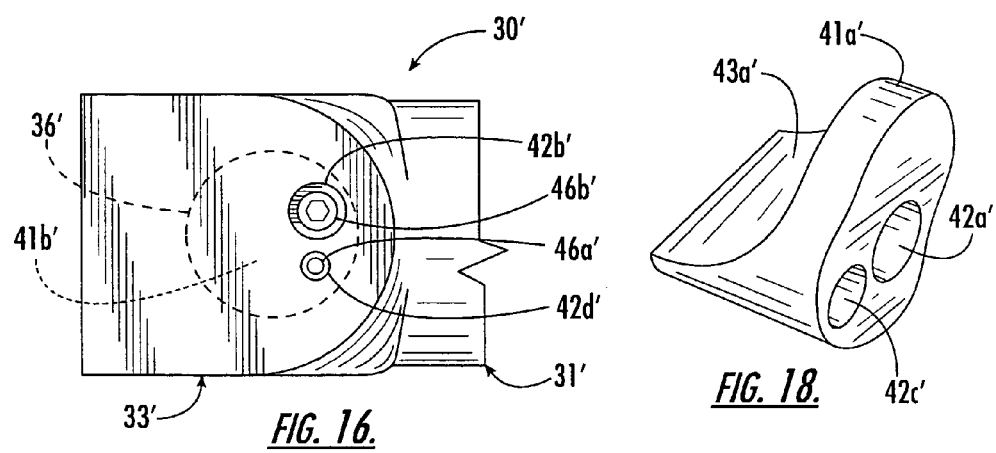
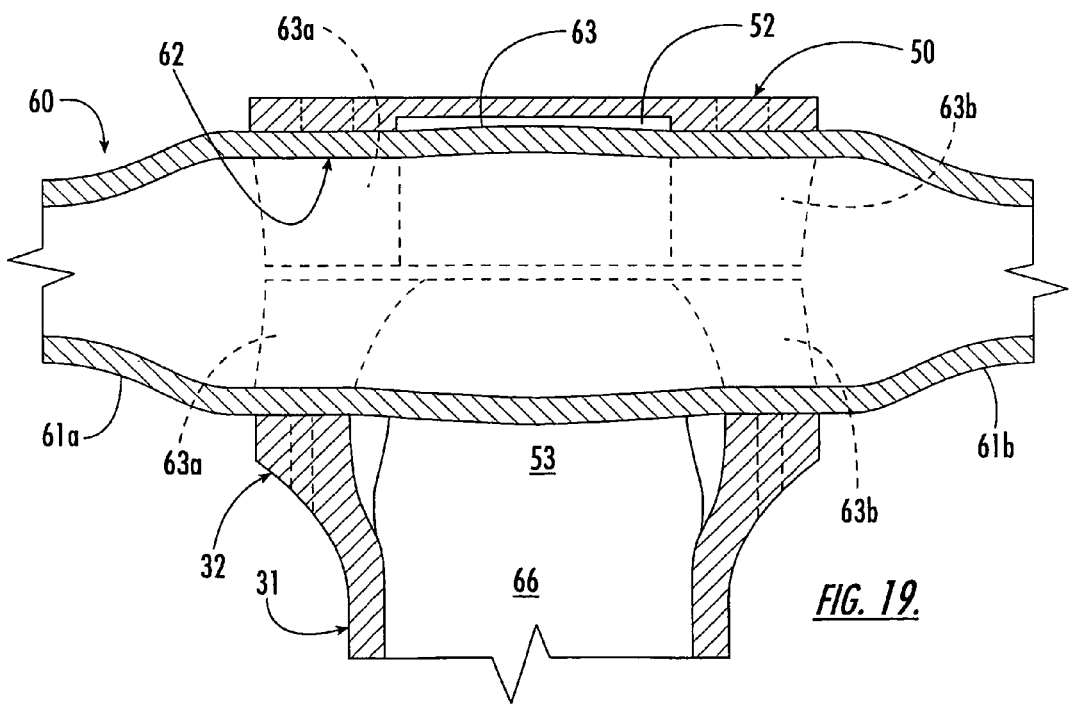

BICYCLE STEM FOR ENLARGED HANDLEBAR PORTIONS AND ASSOCIATED METHODS

RELATED APPLICATION

The present application is based upon provisional patent application Ser. No. 60/153,159 filed on Sep. 9, 1999, and the entire contents of which are incorporated herein by reference.

FIELD OF THE INVENTION

The present invention relates to the field of bicycles and bicycle components, and more particularly, to a bicycle stem for attaching a handlebar to a steering tube of a bicycle.

BACKGROUND OF THE INVENTION

Bicycles are widely used for transportation and recreation. A typical bicycle includes a rear wheel carried by a frame and a front wheel carried by a fork which, in turn, is rotatably connected to a forward portion of the frame. In particular, a steering tube is connected at its lower end to the fork and extends through a corresponding passageway defined in the forward portion of the frame. An upper portion of the steering tube is connected to a bicycle stem.

The bicycle stem includes a steering tube clamping portion which clamps to the upper end of the steering tube. A body portion extends generally forwardly and at an upward incline from the steering tube clamping portion and terminates at a handlebar clamping portion. The incline is generally upward for mountain biking and downward for road biking, as desired by the rider. Of course, the medial portion of the handlebar is connected to the handlebar clamping portion of the stem. The rider is thus able to steer the front wheel by turning the handlebar.

The stem is important for proper orientation and positioning of the rider relative to the bicycle. In addition, the stem is desirably relatively strong to avoid potentially catastrophic failure, and is also desirably lightweight to reduce the burden on the rider. Mountain or off-road biking can put especially high demands on the strength of the stem. Road bikes may also place high demands in terms of both required strength and being relatively lightweight on the bicycle stem.

The stem also desirably has relatively high torsional stiffness, that is, a resistance to allowing the handlebar to rotate as the rider pushes on one side while lifting on the other. If the torsional stiffness is too low, the rider's energy is more quickly and wastefully depleted in rotating the handlebar.

A widely used type of bicycle stem includes a body portion or tube and a steering tube clamp connected to an end of the body tube. The steering tube clamp is in the form of a split tube with a vertical slot opposite the body tube. One or typically two bolts or other fasteners are used to secure clamp together at the vertical slot. Unfortunately, the clamp and fasteners extend backward toward the rider and may present an object which the rider may strike or bang with his knees, for example, such as during vigorous riding.

Another type of steering tube clamping arrangement attempts to remove the clamp and bolts from protruding backward into the rider's space. This type of stem includes a vertically oriented tubular portion defining a main passageway that receives the upper end of the steering tube. To secure the stem relative to the steering tube a clamp may be positioned within a second passageway that extends transverse to the main passageway and which is in communication with the main passageway. The clamp typically includes two cylindrical halves or clamping members which can be urged together by a single fastener, such as a bolt which extends along an axis defined by the cylindrical halves. More particularly, the cylindrical halves each include corresponding arcuate recesses which when properly aligned will press against an outer circumferential portion of the steering tube upon tightening of the bolt to thus clamp the bicycle stem to the steering tube. Such stems are shown, for example, in U.S. Pat. Nos. 5,687,616 and 5,842,385.

Unfortunately, the transverse clamp for the steering tube has relatively little surface area to contact the steering tube. The outermost ends may define contact points which bite into the steering tube, thus forming dimples in the metal steering tube. Such deformations of the metal steering tube may be undesirable for a number of reasons. For example, the dimples may subsequent fine adjustment, since the clamp will tend to seat into the dimples. In addition, for a composite material steering tube an entirely different type of clamping arrangement may be needed to avoid causing damage in the composite material which may propagate to failure of the steering tube. Such composite steering tubes are often used on high-end road bicycles, for example.

Yet another difficulty or shortcoming of many conventional bicycle stems is that have a recess of uniform diameter to grasp or clamp to the handlebar. This uniform diameter may be sufficient for a handlebar with a corresponding uniform diameter at the clamping area; however, many handlebars include a slight bulge or enlarged diameter portion at the clamping area. Accordingly, a conventional clamp will permit the handlebar to wobble slightly. In addition, the clamp will experience greater stress since it is only tightly contacting the handlebar at interior portions of the recess. These shortcomings may lead to failure of the handlebar clamping portion, or unacceptable wobble or loosening of the connection to the handlebar.

SUMMARY OF THE INVENTION

In view of the foregoing background, it is therefore an object of the invention to provide a bicycle stem and associated methods wherein a secure and rugged connection is made to the handlebars.

This and other objects, features and advantages in accordance with the invention are provided by a bicycle stem comprising a body portion and a handlebar clamping portion connected thereto, and a handlebar clamping member cooperating with the handlebar clamping portion to clamp the bicycle handlebar, and wherein the handlebar clamping member and the handlebar clamping portion each have a cavity in a respective medial portion thereof to accommodate an enlarged diameter portion of the handlebar. The enlarged diameter portion may be a tapering in diameter of the handlebar where the handlebar clamp secures to the handlebar.

The stem may also include at least one fastener for securing the handlebar clamping member to the handlebar clamping portion. In addition, a steering tube clamping portion may be connected to a second end of the body portion opposite the handlebar clamping portion. The cavities advantageously can accommodate the enlarged handlebar portion, and while still tightly engaging and holding the handlebar.

The handlebar clamping member may have a generally rectangular shape with a recess for receiving the handlebar.

In other words, the recess and medial cavity define two outer semi-cylindrical areas or bands for contacting the handlebar. The handlebar clamping member may also be completely removable from the handlebar clamping portion in some embodiments, to facilitate installation of the handlebar.

The handlebar clamping portion may also have a recess therein for receiving the handlebar. Accordingly, the recess and medial cavity may similarly define two outer semi-cylindrical areas or bands for contacting the handlebar. The body portion may also have a tubular shape with a hollow interior, and the cavity of the handlebar clamping portion may have an opening therein in communication with the hollow interior of the body portion.

The handlebar clamping member and the handlebar clamping portion may both have generally rectangular shapes overlying one another. In these embodiments, the least one fastener comprises respective fasteners securing corners of the handlebar clamping member and the handlebar clamping portion together. Accordingly, a strong and reliable connection is made with the handlebar. The body portion, handlebar clamping portion and steering tube clamping portion may be integrally formed as a monolithic unit.

The steering tube clamping portion may have a tubular shape defining a steering tube receiving passageway therethrough. The steering tube clamping portion may also have a clamp receiving passageway therein transverse to the steering tube receiving passageway and in communication therewith. A steering tube clamp may be provided in the clamp receiving passageway. The steering tube clamp may include a pair of cooperating clamp members aligned in side-by-side relation and comprising respective portions defining a recess therein for the steering tube.

A method aspect of the invention is for making bicycle stem for connecting a bicycle handlebar to a bicycle steering tube. The method may include forming a body portion and a handlebar clamping portion connected to the end thereof, the handlebar clamping portion having a cavity in a medial portion thereof. The method may also include forming a handlebar clamping member having a cavity in a medial portion thereof and for cooperating with the handlebar clamping portion to clamp the bicycle handlebar therebetween. At least one fastener may be provided for securing the handlebar clamping member to the handlebar clamping portion.

BRIEF DESCRIPTION OF THE DRAWINGS

FIGS. 15, 16 and 17 are left and right side elevational, and top plan views, respectively, of a portion of the steering tube clamping portion of another embodiment of the bicycle stem in accordance with the invention.

FIG. 18 is a perspective view of an embodiment of a steering tube clamp member to be used in the bicycle stem embodiment shown in FIGS. 15–17.

FIG. 19 is a greatly enlarged cross-sectional view taken through the handlebar clamping portion and handlebar clamping member of the bicycle stem as show in FIG. 1.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout. Prime and multiple prime notation are used to indicate similar elements in alternate embodiments.

Figure 1:
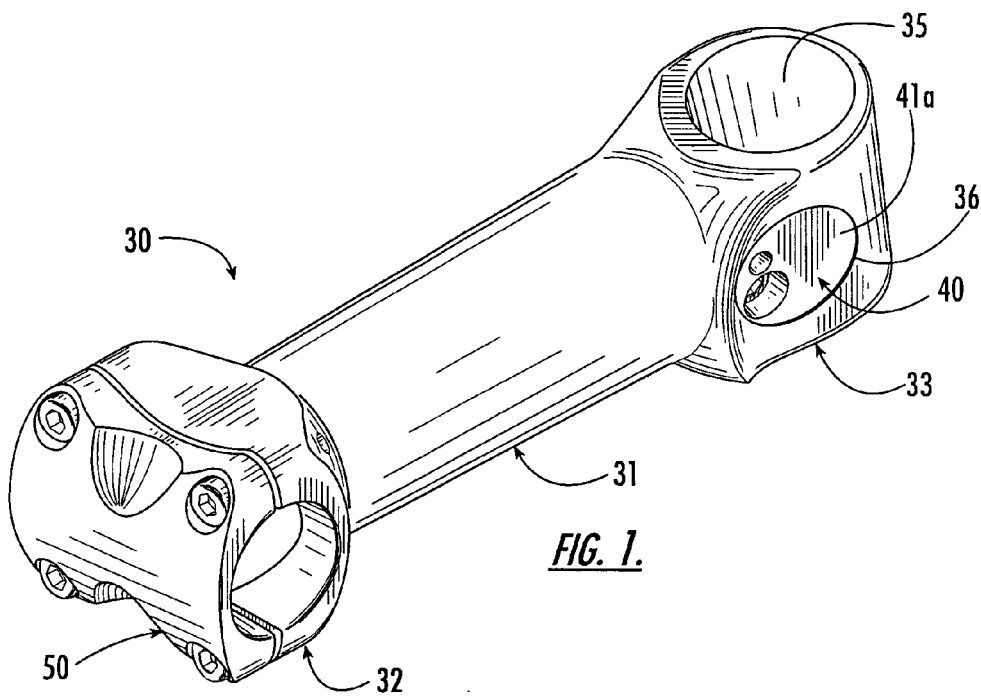
FIG. 1 is a perspective front view of a first embodiment of a bicycle stem in accordance with the present invention.
Figure 2:
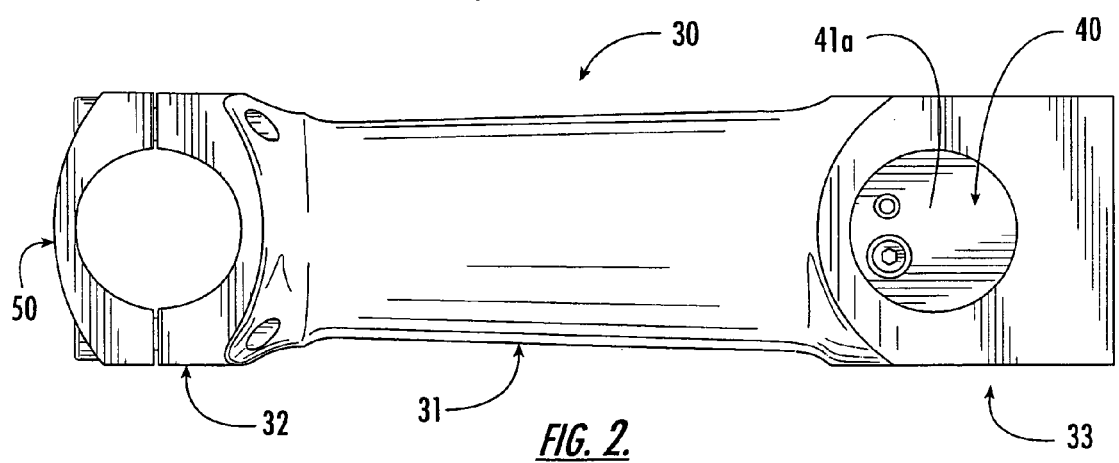
FIG. 2 is a left side elevational vies of the stem as shown in FIG. 1.
Figure 3:
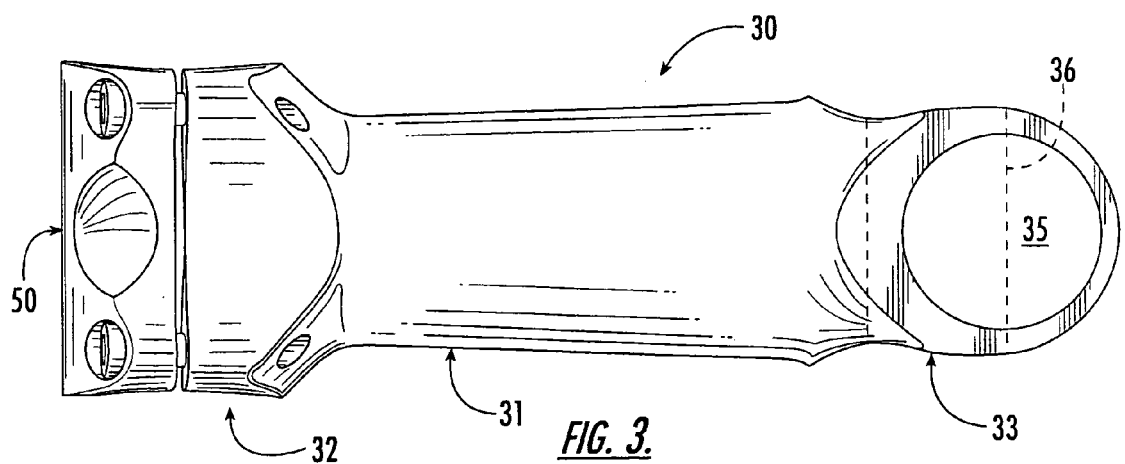
FIG. 3 is a top plan view of the stem as shown in FIG. 1.

Referring initially to FIGS. 1–3, a first embodiment of the bicycle stem 30 in accordance with the invention is now described. The bicycle stem 30 illustratively includes a body portion 31 having opposing first and second ends, a handlebar clamping portion 32 connected to the first end of the body portion, and a steering tube clamping portion 33 connected to the second end of the body portion. A handlebar clamping member 50 is removably secured to the handlebar clamping portion 32 as will be described below in greater detail.

In the illustrated stem 30 the body portion 31 is angled upwardly from the steering tube clamping portion 33. The stem 30 may be reversed when connected to a bicycle so that the body portion 31 angles downwardly from the steering tube clamping portion 33 as will be appreciated by those skilled in the art. For example, for mountain biking many riders may prefer the upward angle, while road bikers may prefer the downward arrangement.

In the illustrated embodiment, the body portion 31 has a tubular construction for reduced weight with a progressively increasing diameter from the first to the second ends. Of course, in other embodiments, the body portion 31 of the stem 30 could be made shorter or longer, and the body portion 31 could be perpendicular to the steering tube clamping portion 33. The body portion 31 could also have a constant diameter, or have other shapes, such as a block shape, as will also be appreciated by those skilled in the art.

The steering tube clamping portion 33 illustratively has a tubular shape defining a steering tube receiving passageway therethrough 35, and a clamp receiving passageway 36 (FIGS. 1 and 3) transverse to the steering tube receiving passageway and in communication therewith. By tubular is meant side walls having an opening or bore therein defining the steering tube receiving passageway 35, and the side walls need not have a uniform thickness in all contemplated embodiments. In some embodiments, the steering tube clamping portion 33, could have a rectangular, polygonal or other shape and still be considered as tubular as will be appreciated by those skilled in the art.

The steering tube clamping portion 33 desirably presents a smooth surface free of protrusions in the direction backward toward the rider. As discussed above in the Background, such protrusions as are common on many conventional stems may be contacted by a knee of a rider.

The body portion 31, handlebar clamping portion 32 and steering tube clamping portion 33 of the stem 30 may be integrally formed as a monolithic unit in some embodiments, thereby also increasing strength especially relative to welded stems. The material may be a metal, such as aluminum, magnesium, steel, or alloys thereof, or the material may be a plastic or composite material, such as carbon fiber, as will be appreciated by those skilled in the art.

Figure 4:
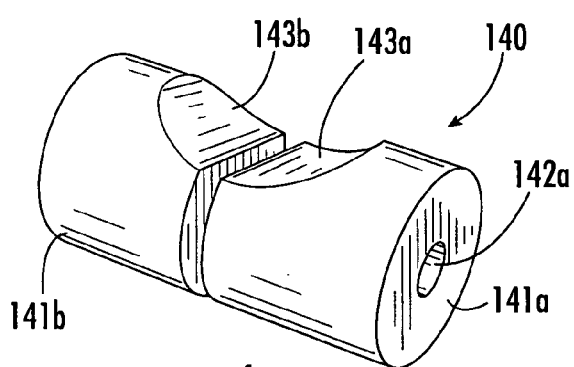
FIGS. 4 and 5 are perspective and side elevational views, respectively, of a steering tube clamp in accordance with the prior art.
Figure 5:
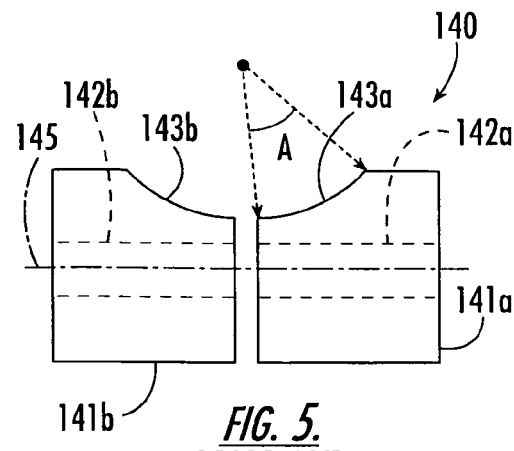

Referring now additionally to FIGS. 4–12, embodiments and aspects of the steering tube clamp 40 are now described. A prior art steering tube clamp 140 is shown in FIGS. 4 and 5 and includes a pair of cooperating clamp members 141a, 141b aligned in side-by-side relation. The prior art steering tube clamp 140 also includes respective portions defining an imaginary cylinder, and a recess, defined by respective recesses 143a, 143b, for the steering tube. Each clamp member 141a, 141b also has a fastener receiving passageway 142a, 142b therein to receive a single fastener, such as a bolt, for example. The fastener receiving passageways 142a, 142b are aligned along the axis 145 defined by the imaginary cylinder.

This prior art arrangement of the fastener receiving passageways 142a, 142b along the axis 145 results in a relatively shallow recess provided by the combination of recesses 143a, 143b. For example, this shallow arrangement may provide contact of one recess 143a of less than about 40 degrees for the angle A as shown in FIG. 5. The total clamp contact onto the steering tube is then less than about 80 degrees. This may result in a weak connection to the steering tube and/or damage to the steering tube, for example.

As shown in the embodiments of the invention in FIGS. 6–12, the stem 30 in some embodiments advantageously includes a steering tube clamp 40, 40' 40" with cooperating clamp members 41a, 41b; 41a', 41b'; 41a", 41b" aligned in side-by-side relation and comprising respective portions defining an imaginary cylinder and a recess therein for the steering tube. The recesses are defined by the individual recesses 43a, 43b; 43a', 43b'; 43a", 43b" as will be appreciated by those skilled in the art. Moreover, each clamp member 41a, 41b; 41a', 41b'; 41a", 41b" also has at least one fastener receiving passageway therein 42a, 42b, 42c, 42d; 43a', 43b'; 43a", 43b" offset a predetermined distance from an axis 45, 45', 45" defined by the imaginary cylinder.

The arrangement of the offset is also illustratively in the direction away from the recess for the steering tube. This configuration provides for a greater area and/or angle of contact between the steering tube clamp 40, 40' 40" and the steering tube. Many of the disadvantages of the prior art steering tube clamp 140 are overcome in accordance with this aspect of the present invention.

The offset may range from several millimeters to 10 or more millimeters depending on the size of the steering tube and other considerations as will be appreciated by those skilled in the art. The offset permits the angle of contact provided by a recess of a clamp member to be greater than about 45 degrees in some embodiments, greater than about 60 degrees in other embodiments, and even greater than 90 degrees in other preferred embodiments. In other words, the recesses may be greater than 90, 120 and even 180 degrees. While prior art clamps 140 may have had a tendency to damage or deform the steering tube from proper roundness, the steering tube clamp 40, 40', 40" in accordance with the invention may actually enhance the roundness of a steering tube that is out of round, such as caused by prior use of a conventional steering tube clamp 140, or from a tube that is out-of-round from the factory.

Figure 6:
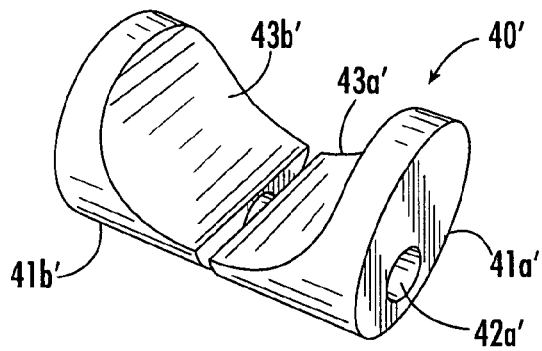
FIGS. 6 and 7 are perspective and side elevational views, respectively, of an embodiment of a steering tube clamp in accordance with the present invention.
Figure 7:
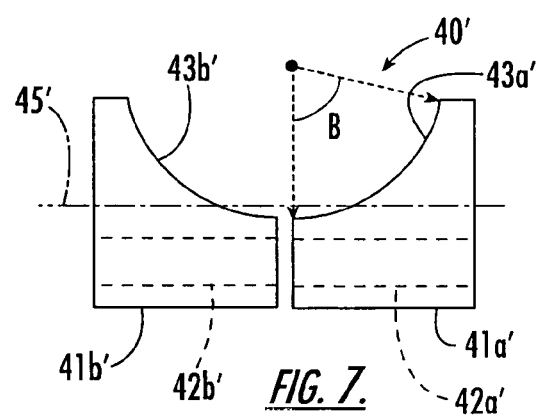

Referring now more particularly to FIGS. 6 and 7, the steering tube clamp 40' includes only a single pair of aligned fastener receiving passageways 42a', 42b' to receive a single fastener, such as a bolt, not shown. In other words, one of the fastener receiving passageways may be threaded and the other may include a stepped diameter to accommodate the enlarged bolt head as will be appreciated by those skilled in the art. Other types of the fastener are also contemplated by the present invention.

In this embodiment of the steering tube clamp 40' the ends of the clamp members 41a', 41b' may be considered as defining circles. Thus the imaginary cylinder defined by the steering tube clamp members 41a', 41b' is essentially a circular cylinder defined by the perimeter portions of the ends of the clamp members in the illustrated embodiment. A relatively large contact angle B is thus defined by the steering tube clamp members 41a', 41b'. Other forms of imaginary cylinders are also contemplated by the present invention, including those having a cross-sectional shape in the form of a rectangle, square, ellipse, and/or polygon, or other shape, as long as such a shape defines an axis from which the fastener receiving passageways are offset.

Figure 8:
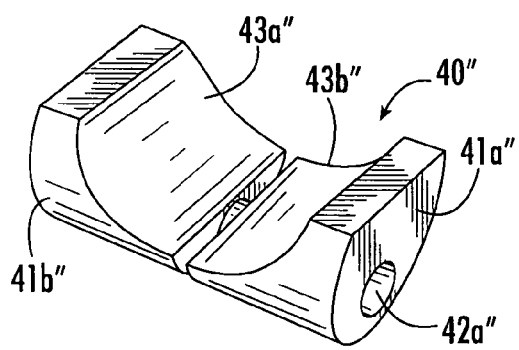
FIGS. 8 and 9 are perspective and side elevational views, respectively, of another embodiment of a steering tube clamp in accordance with the present invention.
Figure 9:
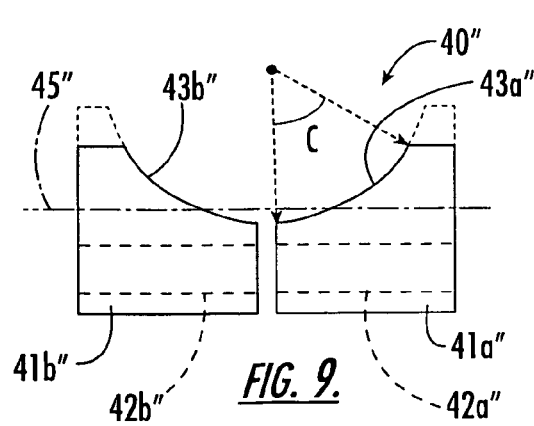

Referring now more particularly, to the steering tube clamp 40" shown in FIGS. 8 and 9, another embodiment or variation is explained. In this variation, end portions of the clamp members 41a", 41b" are each cut or truncated along a plane intersecting the imaginary cylinder as will be readily appreciated by those skilled in the art. In other words, cut-off wing portions are formed at the ends of the clamp members 41a", 41b". A somewhat smaller contact angle C is provided as compared to the steering tube clamp embodiment 40' discussed above with reference to FIGS. 6 and 7, however, the available contact angle C is still greater than the angle A of the prior art steering tube clamp 140.

Referring now briefly again to FIGS. 10–12, this embodiment of the steering tube clamp 40 is similar to the embodiment of the steering tube clamp 40' shown in FIGS. 6 and 7. The steering tube clamp 40 has a profiled shape on the outer end surfaces of each clamp member 41a, 41b to match the curvature of the adjacent portions of the steering tube clamping portion 33 as perhaps best seen in FIG. 1.

In addition, the steering tube clamp 40 includes two fasteners, in the form of bolts 46a, 46b (FIG. 10) arranged in opposite directions. Each bolt 46a, 46b may have an enlarged head and a threaded shaft extending outwardly therefrom. The head may include a recess extending inwardly from an end surface that is keyed, such as to permit turning via an Allen or Torx tool, for example.

In other embodiments, more than two fasteners may be used, and their directions need not be opposing. The dual bolt opposing arrangement does provide some advantages in terms of symmetry, ease of manufacture, and perhaps easier tightening of the fasteners as will be appreciated by those skilled in the art. Of course, using a plurality of fasteners may provide greater holding strength, as well as provide redundancy in the event one of the fasteners fails, becomes loose, or is not properly tightened initially.

Figure 12:
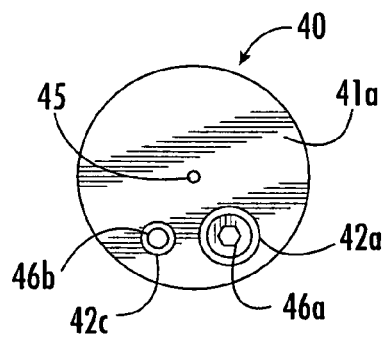
Figure 13:
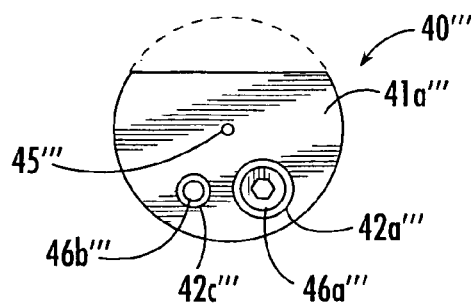
FIG. 13 is an end view of a variation of the steering tube clamp as shown in FIGS. 10–12.

Referring briefly to FIG. 13, a variation of the steering tube clamp 40''' is shown in end view, wherein end portions are truncated along a plane parallel to the axis 45'''. This is similar to the steering tube clamping member 40'' shown in FIGS. 8 and 9. The dual fasteners 46a''', 46b''' are also similar to the steering tube clamp 40 shown in FIGS. 10–12. Accordingly, the steering tube clamp 40''' needs no further description herein.

Figure 11:
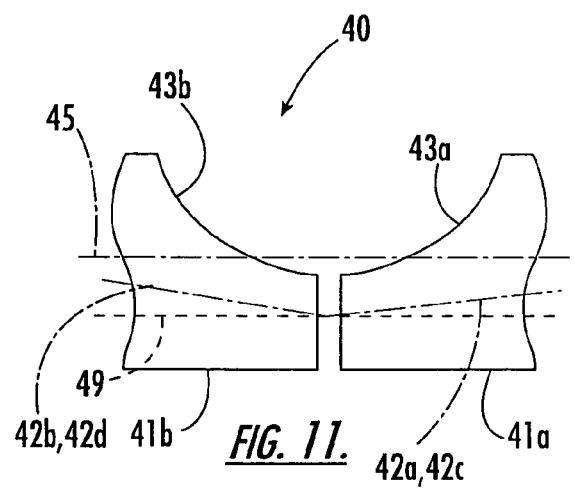
Figure 14A:
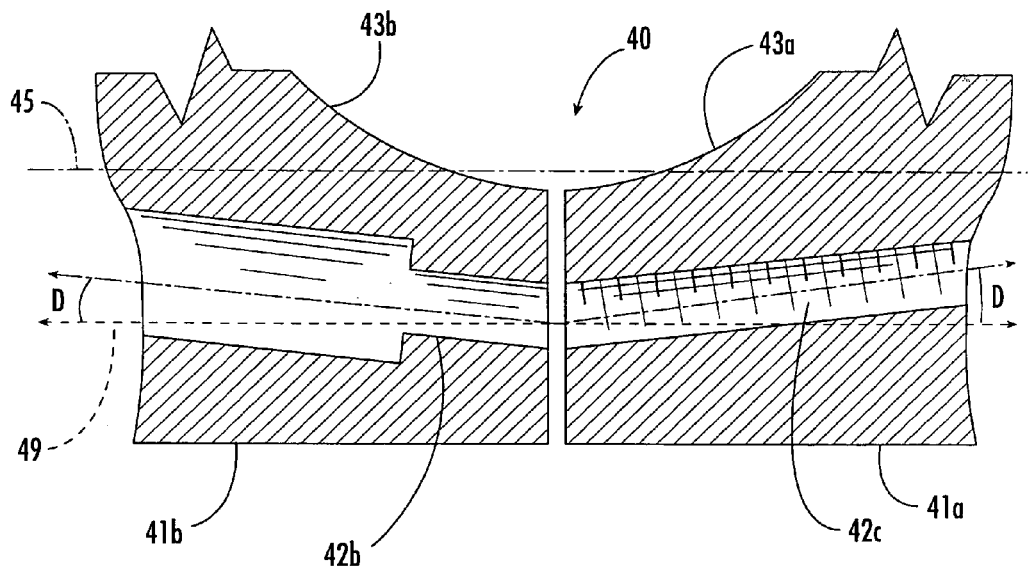
FIGS. 14A and 14B are greatly enlarged longitudinal cross-sectional views of the steering tube clamp as shown in FIGS. 10–12 illustrating the canting angle feature.
Figure 14B:
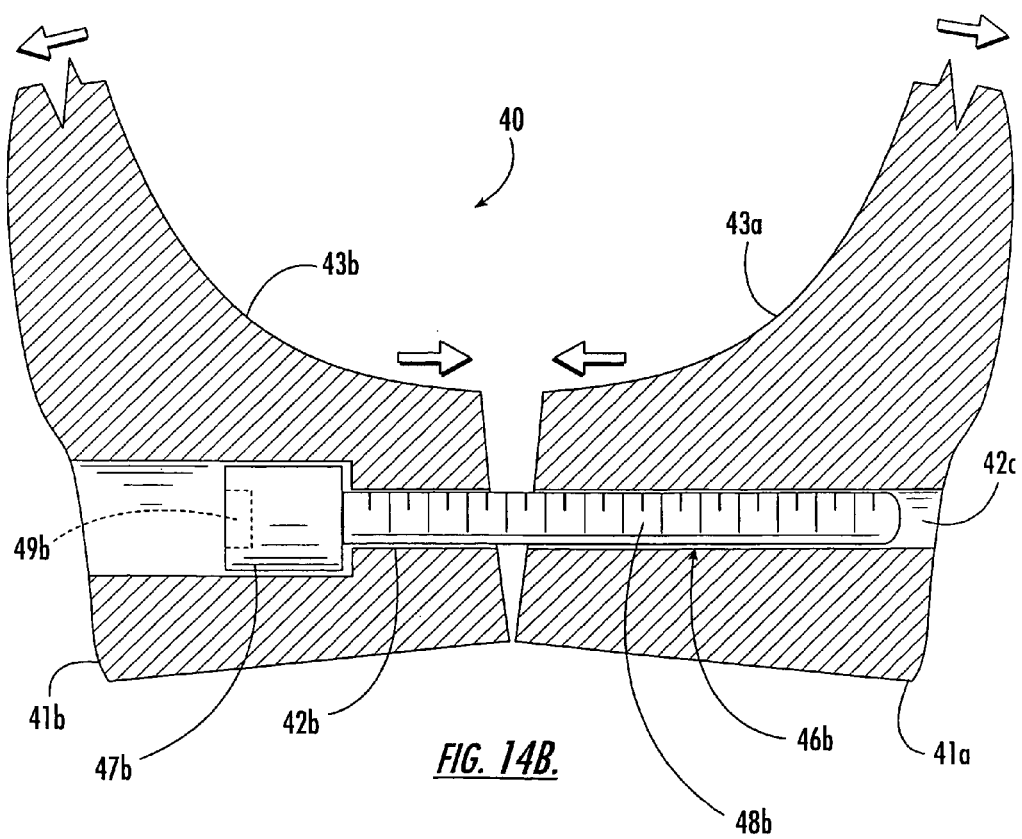
Figures 20, 21:
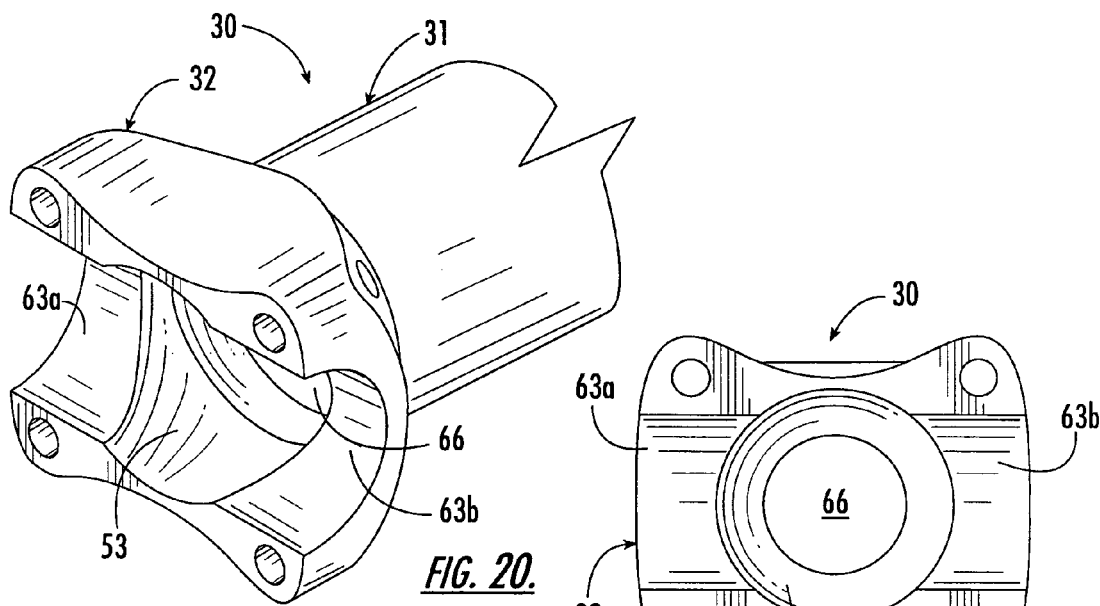
FIGS. 20 and 21 are perspective and end views, respectively, of the handlebar clamping portion of the bicycle stem as shown in FIG. 1 with the handlebar clamp removed for clarity.
Figures 22, 24:
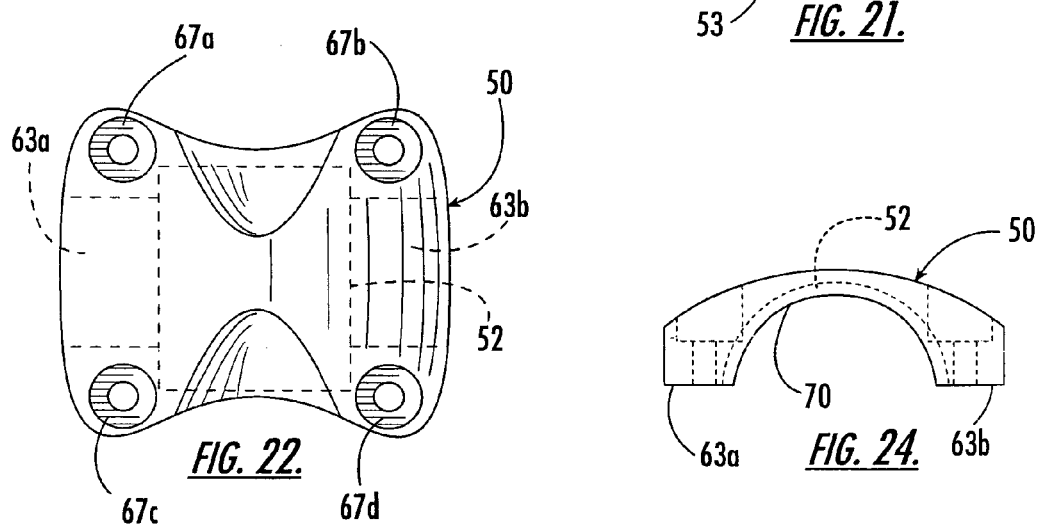
FIGS. 22 and 23 are top plan and bottom plan views, respectively, of the handlebar clamp member as shown in FIG. 1.
FIGS. 24 and 25 are side and end elevational views, respectively, of the handlebar clamp member as shown in FIG. 1.
Figures 23, 25:
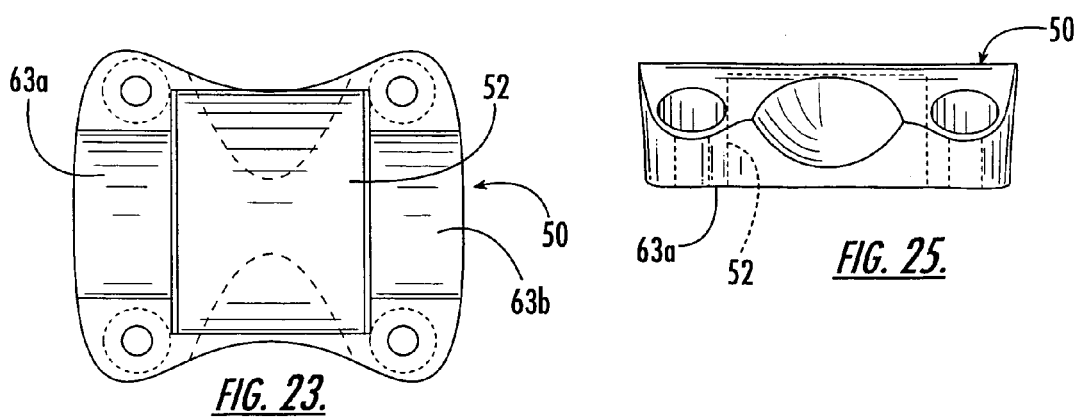

Referring to FIG. 11 and additionally to the enlarged and exaggerated cross-sectional views of FIGS. 14A and 14B, yet another advantageous aspect of the steering tube clamp 40 of the bicycle stem 30 is described. As shown in FIG. 14A, the steering tube clamp 40 illustratively includes a set of fastener receiving passageways 42b, 42c which are canted at a predetermined angle D from parallel to the axis 45 of the imaginary cylinder. The dashed line 49 indicates a parallel line to the axis 45. In other words, in the position shown in FIG. 14A, the passageways 42b, 42c define a shallow V-shape.

This canting allows the fasteners to be tightened with less likelihood of binding as outer portions of the clamp members 41a, 41b engage the steering tube and tend to rotate the outer portions of the clamp members outwardly as the lower portions of the clamp members themselves are being drawn together as shown in FIG. 14B. In the illustrated embodiment, the fastener is in the form of a bolt 46b having an enlarged head 47b and a threaded shaft 48b extending outwardly therefrom. A keyed recess 49b is provided in the end of the bolt head 47b.

For example, the predetermined angle D may be in a range of about one-half to five degrees and, more preferably about one to three degrees. One and one-half degrees for the canting angle D has also been found satisfactory for some embodiments. Although two sets of fastener receiving passageways are shown in the embodiment of the steering tube clamp 40, this canting concept is applicable to a single set or more than two sets.

The same or equivalent effect to canting the fastener receiving passageways at the predetermined angle D may be achieved by changing the outer shape of the clamping members 41a, 41b to be canted as will be appreciated by those skilled in the art.

As will be readily appreciated by those skilled in the art, a number of the advantageous features of the invention may be used independently or in combination. For example, the multiple fasteners may be used with or without the offset. The canting of the angle of the fastener receiving passageways may also be used alone, or in combination with other features. The provision of the recess to extend greater than a predetermined angular amount, can also be used alone or in combination with other features.

Turning now to FIGS. 15–18, another variation of the bicycle stem 30' is now described. In this variation, only a single movable clamping member 41a' is used, and the other mating clamping member is in effect provided by integrally formed opposing wall portions 41b' of the steering tube clamping portion 33'. The movable clamp member may be either on the right or lefthand side as will be appreciated by those of skill in the art. Of course, these opposing wall portions 41b' would also include the fastener receiving passageways 42b', 42d' as shown in the illustrated embodiment, and as will be appreciated by those skilled in the art.

Figure 10:
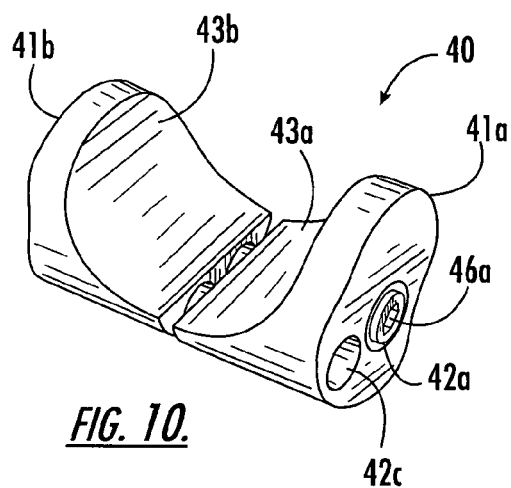
FIGS. 10, 11 and 12 are perspective, and side and elevational views, respectively, of the steering tube clamp as used in the stem of FIG. 1.

In this embodiment, the clamping member 41a' is like the clamping member 41a used in the steering tube clamp 40 as shown in FIGS. 10–12. In other embodiments, the clamping member could have other configurations as also described herein. Accordingly, the clamping member 41a' needs no further description, nor do the other elements of the stem 30' shown in FIGS. 15–18.

Turning now to FIGS. 19 to 25 other advantageous features of the stem 30 are further described, particularly as relating to the handlebar clamping portion 32 and its associated handlebar clamp member 50. In particular, a conventional handlebar 60 as illustrated includes a pair of nominal diameter tubular portions 61a, 61b connected together at a central gripping or clamping portion 62. Moreover, the gripping or clamping portion 62 may be tapered, such as to present an enlarged diameter or slightly larger diameter portion 63 at a medial position thereof. Attempting to clamp uniformly across the entire extent of the tapered or enlarged diameter portion 63 may present difficulties, and strength and/or torsional rigidity of the stem may then be compromised.

The illustrated stem 30 includes the handlebar clamping member 50 which cooperates with the handlebar clamping portion 33 to clamp the bicycle handlebar 60 therebetween. The handlebar clamping member 50 may be secured by one or more removable fasteners so as to be completely removable from the handlebar clamping portion 32 in some embodiments, to thereby facilitate installation of the handlebar 60.

In some prior art stems, the handlebar clamp is defined by a single slot in a tube that can be slightly opened to receive the handlebar. Unfortunately, the handlebar must then be carefully and painstakingly threaded through the small opening. In addition, hardware attached to the handlebar may need to be removed from the handlebar. Accordingly, one advantageous feature of the illustrated stem 30 is that the clamping member 50 may be completely removed to facilitate installation of the handlebar.

The handlebar clamping member 50 and the handlebar clamping portion 32 have respective cavities 53, 52 in respective medial portions thereof to accommodate the enlarged diameter medial portion 63 of the handlebar 60. The handlebar clamping member 50 in the illustrated embodiment has a generally rectangular shape with a semi-cylindrical recess 70 (see, e.g. FIG. 24) formed therein for receiving and engaging the handlebar 60. The semi-cylindrical recess 70 and medial cavity 63 thus define two arcuate contact bands or areas 63a, 63b for tightly engaging the handlebar 60 at spaced apart locations. Indeed these spaced apart contact bands 63a, 63b illustratively extend to the outer edges of the stem 30. Similarly, the handlebar clamping portion 32 illustratively includes a semi-cylindrical recess therein, which, in combination with its medial cavity 53, defines a corresponding pair of arcuate contact bands or areas 63a, 63b which are also spaced from one another to the edges of the stem 30. Accordingly, a rigid and strong connection can be made from the stem 30 to the handlebar 60, such as to reduce torsional rotation during riding, which would otherwise occur to sap the rider's energy.

In the illustrated embodiment, the body portion 31 has a tubular shape with a hollow interior 66. The cavity 53 of the handlebar clamping portion 32 has an opening therein in communication with the hollow interior 66 of the body portion. Accordingly, weight can be reduced without compromising strength.

The handlebar clamping member 50 and the handlebar clamping portion 32 may both have generally rectangular shapes overlying one another. In these embodiments, respective fasteners 67a–67d (FIG. 22) secure the corners of the handlebar clamping member 50 and the handlebar clamping portion 32 together. The handlebar clamping portion 32 may include threaded passageways, and the handlebar clamping member 50 may include corresponding passageways, including enlarged portions to receive the bolt heads as shown in the illustrated embodiment. Of course, this configuration of fasteners 67a–67d could be reversed. Fewer or greater than four fasteners could also be used in other embodiments. In addition, the cavities 53, 52 may be advantageously used in stem configurations, such as the single slot handlebar clamp stem discussed above, and others, as will be appreciated by those skilled in the art.

Figure 26:
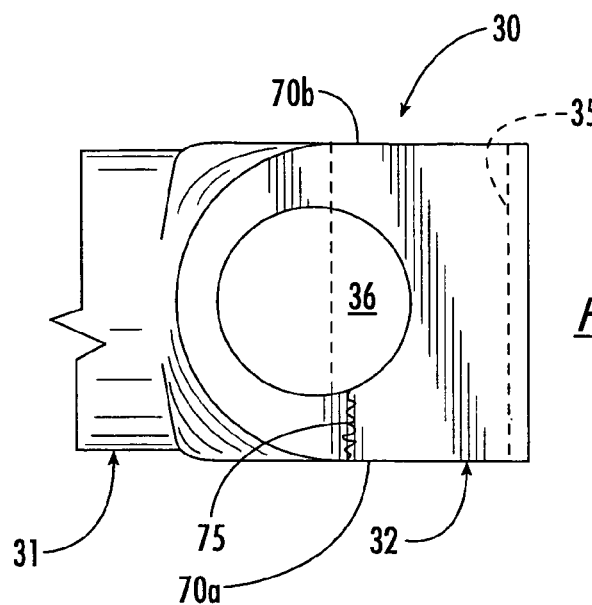
FIGS. 26 and 27 are left and ride side elevational views of the steering tube portion of the bicycle stem as shown in FIG. 1 illustrating the maintenance failure indication.
Figure 27:
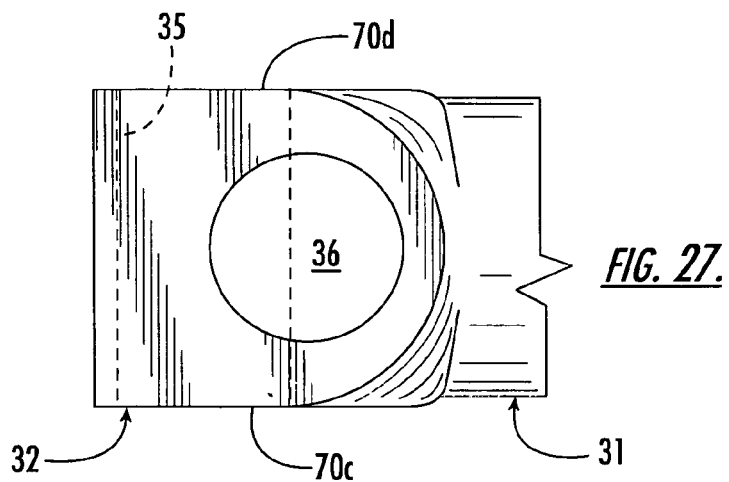
Figure 28:
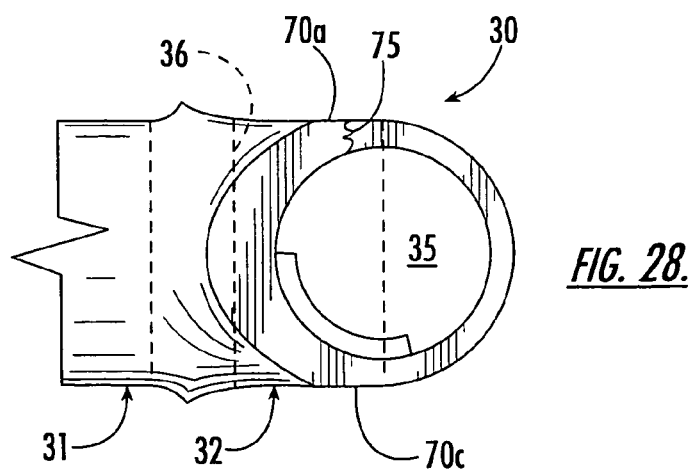
FIG. 28 is a bottom plan view of the bicycle stem as shown in FIGS. 26 and 27.

Turning now additionally to FIGS. 26 to 28 another aspect of the stem 30 in accordance with the invention is now described. In accordance with this aspect, the bicycle stem 30 comprises a body portion 31, a handlebar clamping portion 32 (FIGS. 1–3) and a steering tube clamping portion 33 having relative strengths so that a predetermined portion, such as a leg 70a of the steering tube clamping portion 32, will crack first to thereby provide a visual maintenance indication to a user. As described above the steering tube clamping portion 32 may have a tubular shape defining a steering tube receiving passageway 35 therethrough. The clamp receiving passageway 36 is transverse to the steering tube passageway 35 and in communication therewith. The steering tube clamping portion 32 may thus comprise four legs 70a–70d defined by the steering tube receiving passageway 35 and the clamp receiving passageway 36.

The relative strengths may be configured so that one of the legs, typically a lower leg, such as the illustrated lower leg 70a will form a crack 75 first. Of course, the crack 75 provides a visual indication to the user to repair or replace the stem 30. The other three legs 70b–70d are preferably sufficiently strong to maintain a connection to the steering tube even with one of the legs cracked. Thus the likelihood of unexpected complete or catastrophic failure of the stem is significantly reduced.

By forming a crack 75 first is generally intended to mean forming a crack based upon material fatigue, as opposed, for example, to ultimate breaking strength. Fatigue is typically more of a problem as a bicycle is used over and over again with the rider providing alternating rotational loads on the handlebar. For example, an aluminum embodiment of the stem 30 has been tested to withstand upwards of 80,000 load cycles before the first leg will crack. The test included providing alternating loads of ±92 pounds of force on a test handlebar spanning eighteen inches from end-to-end, and with the stem in the middle. It is further noted that the torsional rigidity of the stem 30 is also very high. For example, greater than 100 foot-pounds of torque may be needed for a one degree deflection of the handlebar.

Although the invention is directed primarily to a bicycle stem, the same or similar concepts are also applicable to connection from one body or device to a tube, rod or bar. For example, the steering tube clamp concepts can be readily extended to any such connections where it is desired to clamp to a tube or solid round bar or rod, for example. Accordingly, many modifications and other embodiments of the invention will come to the mind of one skilled in the art.

In addition, other features relating to the bicycle stem are disclosed in copending patent applications filed concurrently herewith and assigned to the assignee of the present invention and are entitled BICYCLE STEM INCLUDING ENHANCED CLAMP AND ASSOCIATED METHODS, Ser. No. 09/658,389; BICYCLE STEM HAVING VISUAL MAINTENANCE INDICATION AND ASSOCIATED METHODS, Ser. No. 09/658,282; and OBJECT CLAMP INCLUDING CLAMP MEMBERS AND ASSOCIATED METHODS, Ser. No. 09/657,423; the entire disclosures of which are incorporated herein in their entirety by reference. Therefore, it is to be understood that the invention is not to be limited to the specific embodiments disclosed, and that modifications and embodiments are intended to be included within the scope of the appended claims.

That which is claimed is:

1. A bicycle stem for connecting a bicycle handlebar to a bicycle steering tube, the bicycle stem comprising:
   a body portion having a tubular shape with a hollow interior and opposing first and second ends, the first end of said body portion being open and defining a generally circular opening;
   a handlebar clamping portion having a first arcuate extent and connected to the first end of said body portion;
   a handlebar clamping member having a second arcuate extent and cooperating with said handlebar clamping portion to clamp the bicycle handlebar therebetween;
   said handlebar clamping member and said handlebar clamping portion each having a recess for the handlebar and a cavity in a respective medial portion of the recess to accommodate an enlarged diameter portion of the handlebar, the cavity in said recess of said handlebar clamping portion extending fully over the first arcuate extent thereof, the cavity in said recess of said handlebar clamping member extending fully over the second arcuate extent thereof, the cavity in said recess of said handlebar clamping member being defined by an outermost wall that is spaced from opposing portions of the handlebar, the cavity in said recess of said handlebar clamping member having a width substantially the same as a diameter of the circular opening of the first open end of said body portion, the cavity of said recess of said handlebar clamping portion having an opening therein aligned with the circular opening of the first open end of said body portion;
   at least one fastener for securing said handlebar clamping member to said handlebar clamping portion; and
   a steering tube clamping portion connected to the second end of said body portion.

2. A bicycle stem according to claim 1 wherein said handlebar clamping member is removable from said handlebar clamping portion.

3. A bicycle stem according to claim 1 and wherein said recess of said handlebar clamping portion defines with the cavity a pair of spaced apart contact areas for contacting the handlebar.

4. A bicycle stem according to claim 1 wherein said handlebar clamping member and said handlebar clamping portion both have generally rectangular shapes overlying one another.

5. A bicycle stem according to claim 4 wherein said at least one fastener comprises respective fasteners securing corners of said handlebar clamping member and said handlebar clamping portion together.

6. A bicycle stem according to claim 1 wherein said body portion, handlebar clamping portion and steering tube clamping portion are integrally formed as a monolithic unit.

7. A bicycle stem according to claim 1 wherein said steering tube clamping portion has a tubular shape defining a steering tube receiving passageway therethrough, and wherein said steering tube clamping portion also has a clamp receiving passageway therein transverse to the steering tube receiving passageway and in communication therewith.

8. A bicycle stem according to claim 7 further comprising a steering tube clamp in the clamp receiving passageway and comprising a pair of cooperating clamp members aligned in side-by-side relation and comprising respective portions defining a recess therein for the steering tube.

9. A bicycle stem for connecting a bicycle handlebar to a bicycle steering tube, the bicycle stem comprising:
a body portion having a tubular shape with a hollow interior and having an open end defining a generally circular opening;
a handlebar clamping portion having a first arcuate extent, said handlebar clamping portion being connected to the open end of said body portion and having a generally rectangular shape;
a handlebar clamping member having a second arcuate extent and having a generally rectangular shape aligned with said handlebar clamping portion and cooperating therewith to clamp the bicycle handlebar therebetween;
said handlebar clamping member and said handlebar clamping portion each having a recess for the handlebar and a cavity in a respective medial portion of the recess to accommodate an enlarged diameter portion of the handlebar, the cavity in said recess of said handlebar clamping portion extending fully over the first arcuate extent thereof, the cavity in said recess of said handlebar clamping member extending fully over the second arcuate extent thereof, the cavity in said recess of said handlebar clamping member being defined by an outermost wall that is spaced from opposing portions of the handlebar, the cavity in said recess of said handlebar clamping member having a width substantially the same as a diameter of the circular opening of the open end of said body portion, the cavity of said recess of said handlebar clamping portion having an opening therein aligned with the circular opening of the open end of said body portion; and
respective fasteners for securing corners of said handlebar clamping member and said handlebar clamping portion together.

10. A bicycle stem according to claim 9 wherein said recess of said handlebar clamping member defines with the cavity a pair of spaced apart contact areas for contacting the handlebar.

11. A bicycle stem according to claim 9 wherein said handlebar clamping member is removable from said handlebar clamping portion.

12. A bicycle stem according to claim 9 and wherein said recess of said handlebar clamping portion defines with the cavity a pair of spaced apart contact areas for contacting the handlebar.

13. A bicycle stem according to claim 9 further comprising a steering tube clamping portion connected to an end of said body portion opposite said handlebar clamping portion.

14. A bicycle stem according to claim 13 wherein said body portion, handlebar clamping portion and steering tube clamping portion are integrally formed as a monolithic unit.

15. A bicycle stem according to claim 13 wherein said steering tube clamping portion has a tubular shape defining a steering tube receiving passageway therethrough, and wherein said steering tube clamping portion also has a clamp receiving passageway therein transverse to the steering tube receiving passageway and in communication therewith.

16. A bicycle stem according to claim 15 further comprising a steering tube clamp in the clamp receiving passageway and comprising a pair of cooperating clamp members aligned in side-by-side relation and comprising respective portions defining a recess therein for the steering tube.

17. A bicycle stem for connecting a bicycle handlebar to a bicycle steering tube, the bicycle stem comprising:
a body portion having a tubular shape defining a hollow interior and having an open end defining a generally circular opening;
a handlebar clamping portion having a first arcuate extent, the handlebar clamping portion being connected to the open end of said body portion and having a recess therein for the handlebar, said handlebar clamping portion further having an opening in a medial portion of the recess aligned with the circular opening of the open end of said body portion;
a handlebar clasping member having a second arcuate extent and cooperating with said handlebar clamping portion to clamp the bicycle handlebar therebetween, said handlebar clamping member having a recess for the handlebar and a cavity in a medial portion of the recess, the cavity in said recess of said handlebar clamping member extending fully over the second arcuate extent thereof, the cavity in said recess of said handlebar clamping member being defined by an outermost wall that is spaced from opposing portions of the handlebar, the cavity in said recess of said handlebar clamping member having a width substantially the same as a diameter of the circular opening of the open end of said body portion; and
at least one fastener for securing said handlebar clamping member to said handlebar clamping portion.

18. A bicycle stem according to claim 17 wherein said handlebar clamping member is removable from said handlebar clamping portion.

19. A bicycle stem according to claim 17 wherein said handlebar clamping member and said handlebar clamping portion both have generally rectangular shapes overlying one another.

20. A bicycle stem according to claim 19 wherein said at least one fastener comprises respective fasteners securing corners of said handlebar clamping member and said handlebar clamping portion together.

21. A bicycle stem according to claim 17 further comprising a steering tube clamping portion connected to an end of said body portion opposite said handlebar clamping portion.

22. A bicycle stem according to claim 21 wherein said body portion, handlebar clamping portion and steering tube clamping portion are integrally formed as a monolithic unit.

23. A bicycle stem according to claim 21 wherein said steering tube clamping portion has a tubular shape defining a steering tube receiving passageway therethrough, and wherein said steering tube clamping portion also has a clamp receiving passageway therein transverse to the steering tube receiving passageway and in communication therewith.

24. A bicycle stem according to claim 23 further comprising a steering tube clamp in the clamp receiving passageway and comprising a pair of cooperating clamp members aligned in side-by-side relation and comprising respective portions defining a recess therein for the steering tube.

* * * * *